Robert E. McCleary & Robert L. Decker
INVENTORS

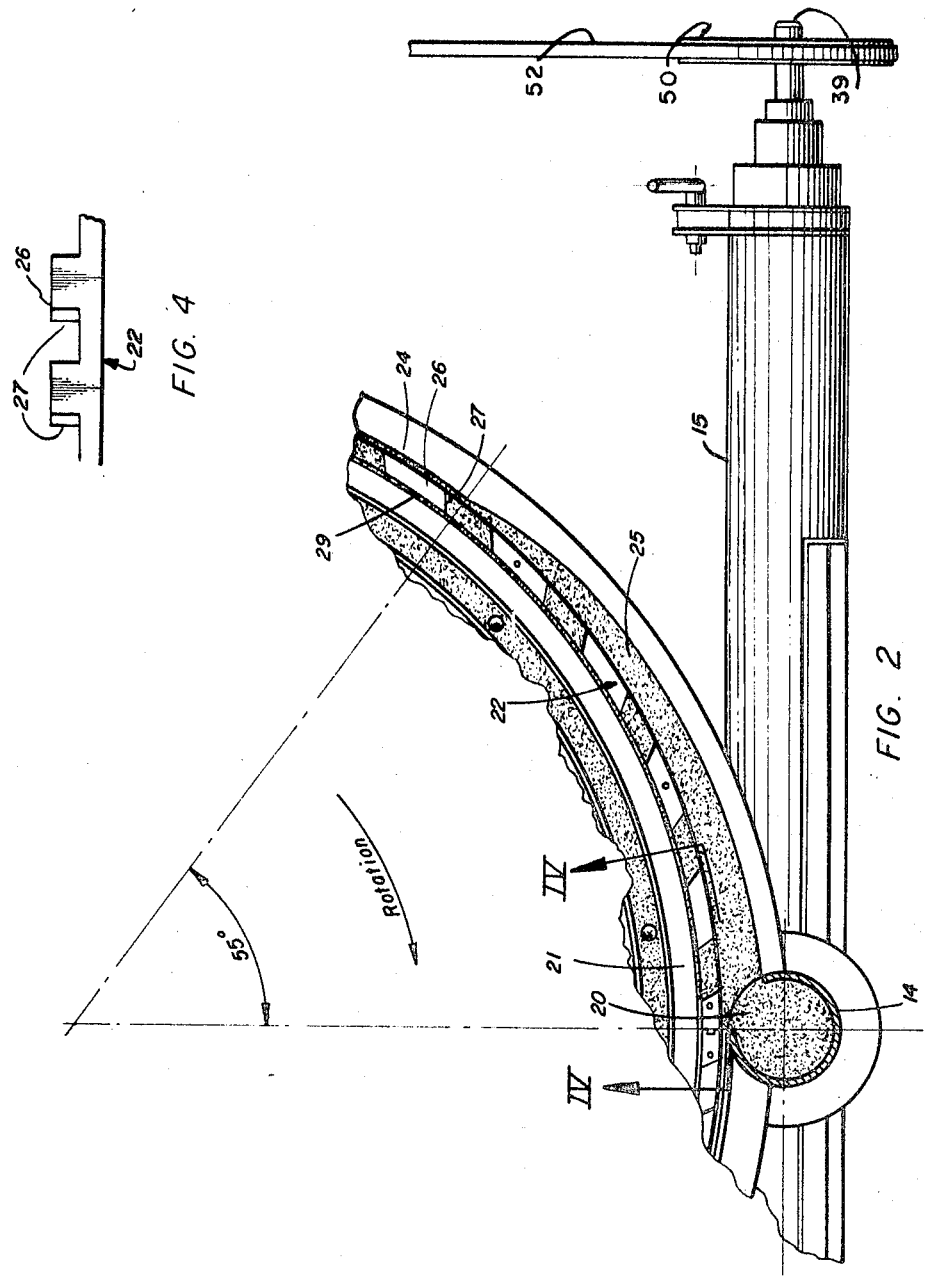

Aug. 5, 1969   R. E. McCLEARY ET AL   3,459,620
APPARATUS FOR PRODUCING CAST GYPSUM ARTICLES
Filed Oct. 11, 1965   5 Sheets-Sheet 4

Robert E. McCleary & Robert L. Decker
INVENTORS

BY Pendleton, Neuman, Seibold, & Williams
ATTORNEY

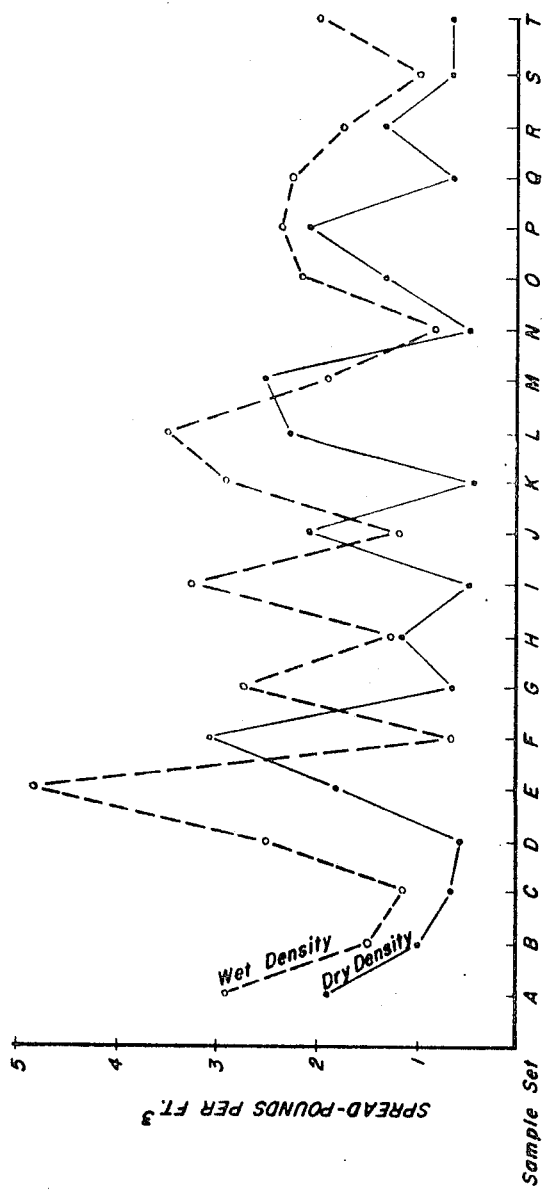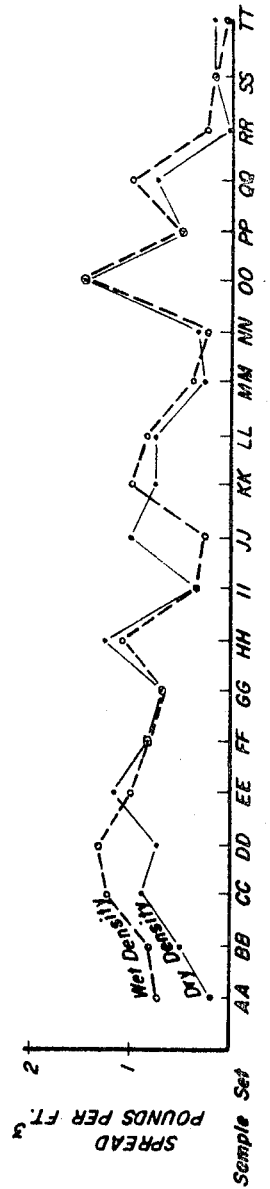
FIG. 7A Three Gate Operation
FIG. 7B Mixer Distributor Operation
Robert E. McCleary & Robert L. Decker
INVENTORS
ATTORNEY

United States Patent Office 3,459,620
Patented Aug. 5, 1969

3,459,620
APPARATUS FOR PRODUCING CAST GYPSUM ARTICLES
Robert E. McCleary, Geneva, and Robert L. Decker, Park Forest, Ill., assignors to United States Gypsum Company, Chicago, Ill., a corporation of Delaware
Filed Oct. 11, 1965, Ser. No. 494,577
Int. Cl. B32b *13/00;* B28b *5/02*
U.S. Cl. 156—346                                                9 Claims

ABSTRACT OF THE DISCLOSURE

In a gypsum board machine a slurry mixer disposed over a board-forming table discharges slurry into a vertical conduit which in turn feeds a slurry distributor disposed across and parallel to the surface of a board-forming table. The distributor employs a continuous discharge slot and transfer means for laying a uniform, continuous layer of slurry on the table.

---

This invention relates to the production of cast gypsum articles, and more particularly pertains to a process and apparatus for forming gypsum board having gypsum cores of highly uniform composition.

Gypsum board is normally produced by feeding a slurry of calcium sulfate hemihydrate, water, foam, and any other desired additive such as setting modifiers, between two sheets of paper. The paper strips are drawn beneath a thickness-adjusting roller and, after setting of the gypsum, conveyed through a drying chamber to remove excess water.

Although the conversion of the hemihydrate, or stucco, into the set gypsum core requires the addition of about 18 percent water based on the hemihydrate weight, water in excess of this stoichiometric quantity is necessary to provide a workable slurry. Normally a stucco-water weight ratio of 1—1 is employed and in addition, approximately 25–35 percent by volume of premixed foam is introduced into the slurry to increase its fluidity and reduce the density of the ultimate board. The use of foam in board is well known and disclosed in Roos Patent No. 2,017,022 dated Oct. 8, 1935 and Roos Patent No. 2,080,009 dated May 11, 1937.

The raw materials for the gypsum board cores are normally mixed in centrifugal "pin" mixers which utilize a rotating disc having radially-arranged, projecting pins which pass between projecting stationary pins secured to an opposed surface of a housing for the rotating disc. Formed at intervals about the housing periphery are inlet ports to three conduits adapted to direct slurry urged into the ports to the underlying paper disposed on the board-forming table. Concentric rings may be affixed to outer peripheral portions of the rotor disc and extend upwardly about half the distance to the overlying housing cover.

Stationary concentric rings affixed to the housing cover extend into the intervals between the rotor rings and are discontinuous so as to provide openings. Thus, the calcium sulfate hemihydrate, water, foam and other additives entering the mixer through the housing cover are intimately admixed by the coaction of the pins and moved outwardly by centrifugal force through the ring maze and stationary ring openings and into the three inlet ports. A pin mixer similar to that above-described is disclosed in Camp et al. Patent No. 2,660,416 which issued Nov. 24, 1953.

The cores for gypsum board are normally cast in widths of 48 inches. Utilizing a pin mixer having three conduits from the mixer housing, the slurry is discharged in three streams which are laid down on a first sheet of paper which is passing under the mixer on a board-forming table. These three streams spread out and join just before the second layer of paper is applied and the board adjusted for thickness by a roll engaging the upper paper strip of the moving gypsum sandwich. This method of manufacture results in a gypsum core which varies in density across its width.

It is not fully understood whether the nonuniformity is caused by inadequate performance of the mixer itself or the higher centrifugal forces encountered near the periphery of the mixer which bring about a separation of a previously well-mixed slurry. In any event, the usual result of employing a "three-gate" discharge system is that the material discharged from the different gates is not of uniform density. To some extent this can be corrected by varying the total volumes discharged through each gate, but even with frequent adjustment, the result is a variation from about 2 percent to about 5 percent in the core density from location to location across the board.

Gypsum board of various types, adapted to serve various uses, are wallboard, lath, formboard and like products, manufactured from paper cover sheets and a cast gypsum core. Each of these boards must possess a minimum structural strength. Because of the variation in density, an excess of gypsum must be used in the cores when utilizing the known pin mixers to insure that the weakest spot in the product meets a requirement for minimum strength and hardness.

An additional problem caused by nonuniform cores arises when the large excess of water employed to produce a workable slurry is driven off in a kiln to produce a dry board. If the water is not uniformly distributed in the core, the areas having too much water will come out damp, and those having too little water will be "burned" and have greatly reduced hardness and structural strength. Both of these conditions adversely affect the quality of the product so that it is essential that the water as well as the stucco be distributed throughout the cast core as uniformly as possible. Obviously all additives employed in the formation of cast gypsum articles should be uniformly dispersed throughout the slurry, since a high-quality product must be consistently uniform throughout.

It is an object of this invention, therefore, to provide a process and apparatus for forming a slurry and distributing the same in such manner that the final cast product formed therefrom is of exceptional uniformity.

It is another object of this invention to provide apparatus for forming a slurry which positively controls the passage of the basic slurry ingredients through the apparatus. Such control insures discharge of calcium sulfate hemihydrate slurry from the mixer witth a minimum of recycling, and thereby insures the discharge of a uniform flowable slurry, free of lumps.

It is another object of this invention to provide a slurry-distributing apparatus which is substantially self-cleaning and of a simple design which requires less maintenance than apparatus previously employed.

The above and other objects of this invention will become more apparent upon proceeding with the following detailed discussion when read in the light of the accompanying drawing and appended claims.

In one apparatus made in accordance with the teachings of this invention, a pin mixer is provided in which the rotor disc has a toothed, outermost ring. The tooth elements are beveled to force the slurry engaging the same outwardly against the encompassing housing wall. A portion of the wall spirals towards a single vertical conduit opening, as the opening is approached from the direction of disc rotation, thereby facilitating passage of the slurry into said opening.

The vertical conduit communicates with the center of an underlying dispensing casing disposed across an underlying table on which gypsum board is formed. The casing has rotatable therein helical distributors which move the slurry along a portion of the casing length and force the same in a uniform, continuous flow through an elongate slot formed in the casing bottom, as will hereinafter be described in greater detail.

The invention will be better understood by reference to the drawings wherein:

FIG. 2 is a fragmentary plan view of the apparatus, partly broken away, to show internal portions of the mixer;

FIG. 4 is a view taken along line IV—IV of FIG. 2 illustrating teeth on the outermost ring of the rotor disc;

FIG. 7A is graph illustrating typical performance of prior art apparatus; and

FIG. 7B presents data similar to that shown in FIG. 7A which is indicative of the performance of the apparatus and process of this invention.

Figure 1:
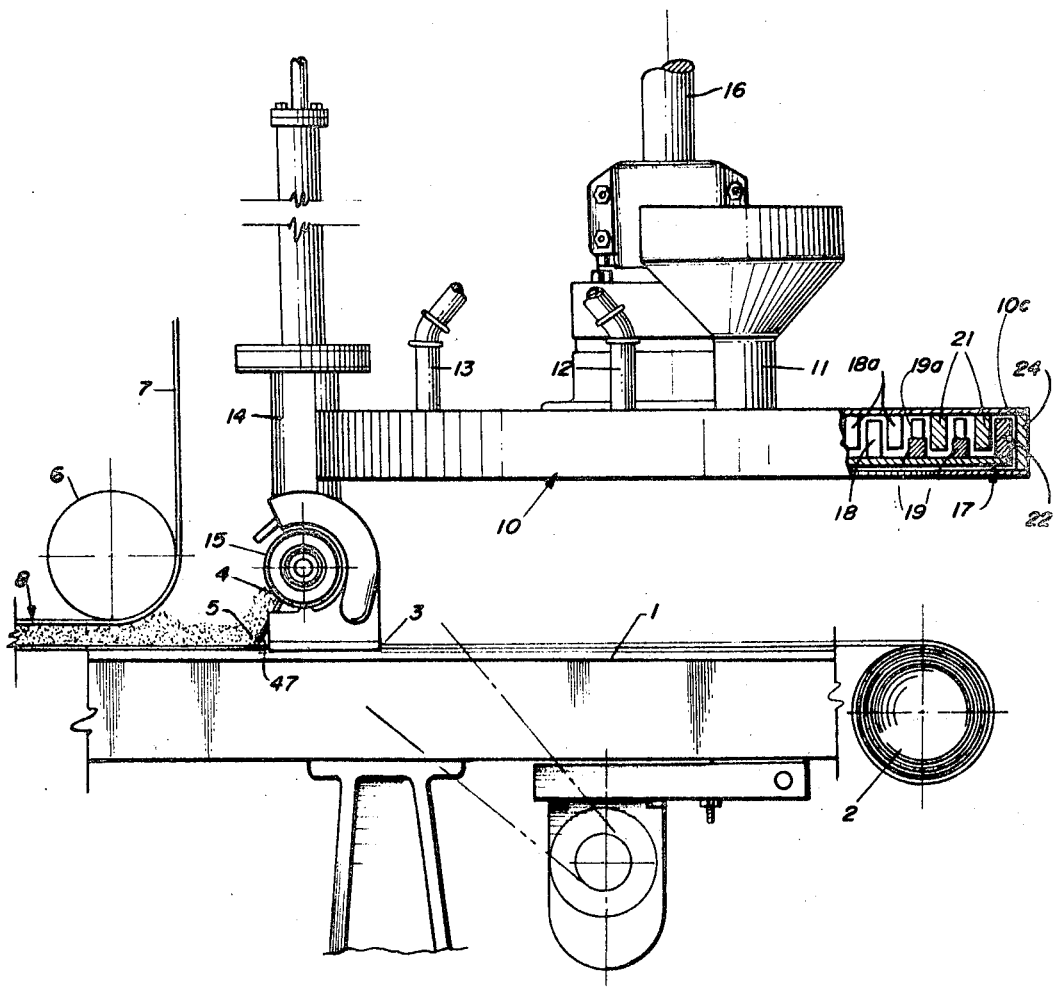
FIGURE 1 is a fragmentary, elevational view, partly in section, illustrating the general arrangement of the apparatus components.

Referring now to FIG. 1, there is illustrated a board-forming table 1 which is an elongated, generally horizontal working surface upon which gypsum board is formed. A bottom cover sheet for the board is supplied from roll 2 and led up to the table at 3 where it passes beneath slurry-dispensing casing 15. The mixed slurry is discharged from the apparatus at 4 and deposited on the paper cover sheet at 5. Roll 6 smooths out the slurry and positions top paper layer 7 to form a board 8 of desired thickness.

A pin mixer 10 into which the basic slurry components are introduced is connected to the underlying slurry-dispensing casing 15 by means of vertical conduit 14. The mixer 10 is provided with a feed hopper 11 for introduction of stucco, as well as feed conduits 12 and 13 by means of which water, foam, and other desired additives may be added to the slurry.

Figure 6:
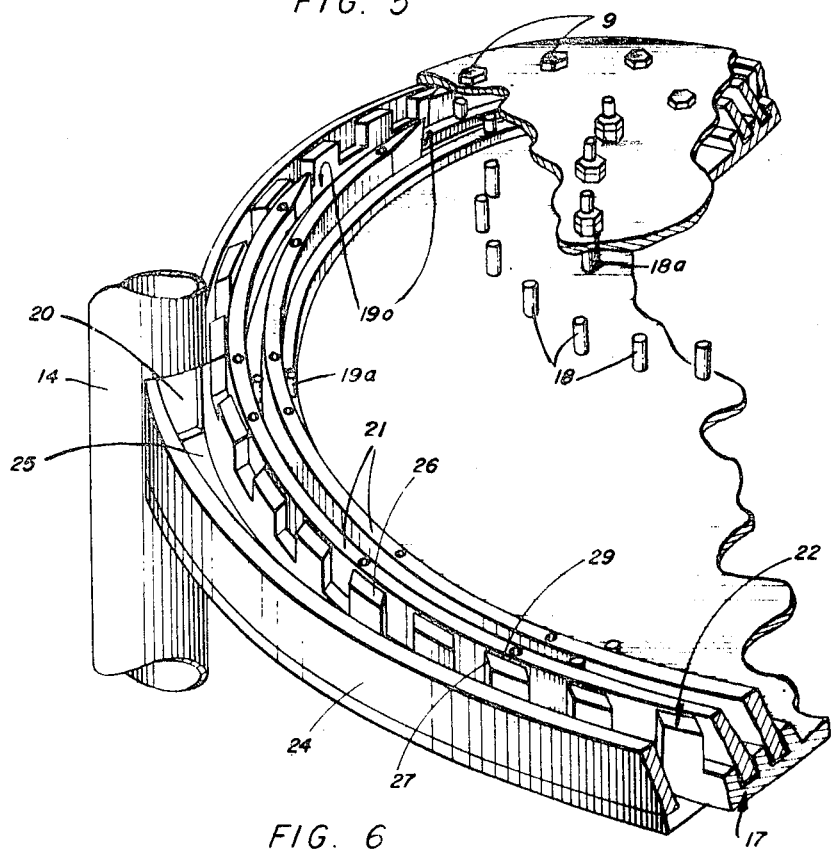
FIG. 6 is a fragmentary perspective view, partly broken away, disclosing the slurry conduit and the interior of the outer portion of the mixer of the illustrated apparatus embodiment.

Rotatably driven by shaft 16 and movable in mixer 10 is a rotor disc 17 most clearly seen in FIGS. 1 and 6. The disc has a plurality of radially distributed, upwardly-extending pins 18 adapted to pass between a stationary, downwardly-extending set of pins 18a secured to mixer cover 10c. Concentric rings 19 extending in height about half-way to the mixer cover are arranged on outer annular portions of the disc 17 and rotate in circular paths adjacent the outermost overlying pins 18a and adjacent the outer rings 21 depending from the cover. The rings 21 are secured to the cover 10c by bolts 9. Spaced pins 19a of smaller dimensions than pins 18 and 18a are mounted at spaced intervals on the rings 19. Rings 19 have openings 19o formed therein (see FIG. 6) which allow passage of the mixed slurry from the inner portions of the mixer 11 to a location outside the disc 17 adjacent vertical wall 24 of the mixer.

Outermost rotor ring 22 secured to the outer periphery of disc 17 has a plurality of teeth 26 projecting therefrom. Leading edges 27 of the teeth 26 form acute angles with inner sides 29 (see FIG. 6) of the teeth. The construction of the rotor ring can be better understood by reference to FIG. 4 which illustrates a ring fragment on an enlarged scale. The direction of the rotation of the mixer is shown by the arrow in FIG. 2. The outer wall 24 of the mixer spirals outwardly by receding gradually from the circular path of the rotor ring 22 to form a relief 25, defined by the diverging wall 24 and disc ring 22, into which the slurry moves prior to entering port 20 of vertical conduit 14 in the manner also seen in FIG. 2. The shape of the teeth 26 is such that their edges 27 tend to force the slurry into the relief 25 as the rotor ring moves about its path. The arrangement of these elements is also illustrated in FIG. 6.

The relief 25 must begin some distance from the conduit port 20 to allow ample space for all the slurry to pass from the rotor ring. At a mixer speed of 300 revolutions per minute, a relief arc of about 55°, as indicated in FIG. 2, was found to be sufficient. With different mixer conditions, some other beginning point for the relief might be desirable; the determintion of such relief is believed to be well within the skill of the art.

Figure 3A:
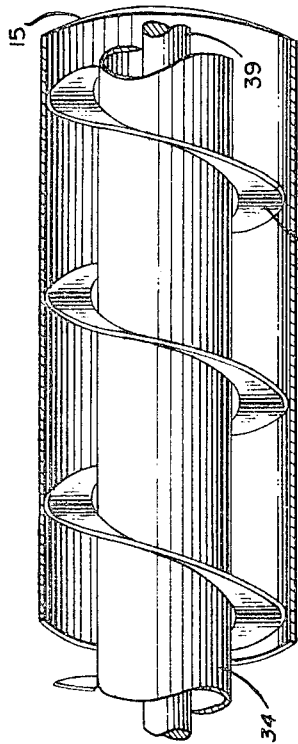
FIG. 3A is an enlarged, fragmentary view, partly broken away, illustrating an auger portion disposed in the slurry-dispensing casing of the illustrated apparatus.
Figure 3:
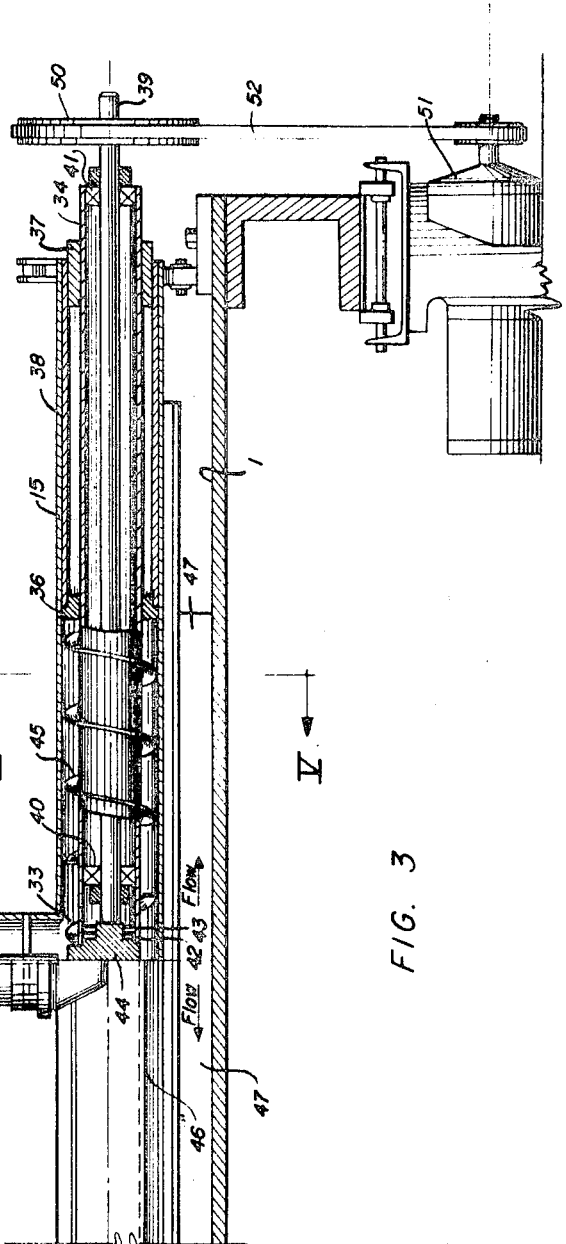
FIG. 3 is a fragmentary, front elevational view, partly broken away and partly in section, illustrating interior details of the central and lower portions of the apparatus shown in FIG. 1.

Referring now to FIG. 3, vertical conduit 14 is shown sectioned to reveal the entrance port 20 through which the mixed slurry enters. Within the conduit is a helical conveyor 30 driven from above by the shaft 31 and driving means, not shown. The conduit opens into the horizontal slurry-distributor casing at juncture 33 comprising a centrally-disposed, slurry inlet into the casing 15.

The distributor is generally symmetrical about its vertical center line, and to simplify the description thereof, reference will be made only to that portion shown in section in FIG. 3. It will be understood, however, that corresponding members are provided in the portion of the distributor which is not fully shown.

Extending endwise from opposed portions of the casing 15 are stationary support tubes 34 which terminate at their inner ends adjacent slurry inlet 33. Each support tube is located within the casing by a pair of collars 36 and 37 and a sleeve 38. Mounted in opposed end portions of each support tube 34 are bearings 40 and 41. The bearings are adapted to accommodate opposed end portions of a rotatably-driven shaft 39. The shaft 39 has a sheave 50 affixed to one end portion thereof enabling the shaft to be rotated by variable speed motor 51 through belt 52.

The bearings 40 adjacent to the slurry inlet 33 are protected by shaft seals 42 and 43. Driver member 44 is secured to the inner end of each shaft 39 and adapted to rotate a screw auger 45, to which each member 44 is connected, about the stationary support tube 34 (see FIG. 3A). The pitch and hand of each screw auger disposed in the opposed casing portions straddling slurry inlet 33 and its direction of rotation are such that material is conveyed by each auger from the center of the casing toward its ends.

Figure 5:
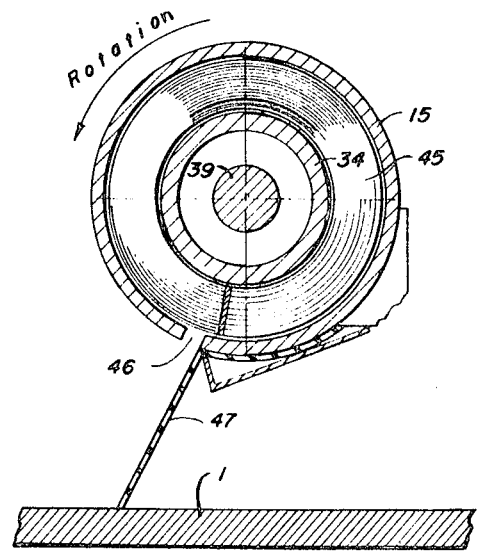
FIG. 5 is a sectional view taken along line V—V of FIG. 3.

A longitudinal slot 46 disposed in the casing bottom, see FIG. 5, allows the slurry to be discharged in a continuous flow across the face of the work table. A rubber apron 47 is positioned beneath the slot 46 to receive the slurry and direct it onto the paper sheet. Since the auger direction of rotation is always downwardly against the apron 47, undesirable splashing of the slurry is obviated.

In operation, stucco, water and foam in the desired proportions are introduced to the mixer 10 through mixer inlets 11, 12 and 13. As the ingredients progress through the mixer, they form a slurry and with the assistance of centrifugal force eventually pass beyond the last stator ring 21, after which teeth 26 engage the slurry and propel it outwardly into the relief 25 and through the conduit port 20. This positive discharging action of the teeth insures that a minimum of slurry will by-pass the port 20 and remain in the mixer to form a crystallized gypsum. The lack of recycle slurry contributes materially to both improved mixer operation and board products.

The slurry is discharged into the conduit 14 through which it is conveyed to the inlet 33. In some instances it may not be necessary to employ the conveyor 30 within the conduit to accelerate the movement of the slurry. As the slurry passes through the inlet 33, it is divided and the two portions conveyed outwardly through the casing 15 by screw augers 45, only one of which is shown. The companion screw auger, not shown, has about the same pitch and the opposite hand so that they may be revolved at the same, or nearly the same, speed in the same direction while conveying the slurry portions towards the opposed ends of the casing 15.

The companion screw auger may be driven by its own on 16 inch centers approximately centered across the board table.

These data are presented in subjoined Table I and show the dry density of the set gypsum and also the amount of water lost during the drying process. The two "Variation" columns of Table I indicate the nonuniformity in stucco and moisture content of the three samples within each set.

TABLE I

| Sample set | Sample station | Dry density pounds per ft.$^3$ | Variation within the sample set, percent | Evaporation, pounds per ft.$^3$ | Ratio | Variation within the sample set, percent |
| --- | --- | --- | --- | --- | --- | --- |
| A | 1<br>2<br>3 | 44.5<br>46.6<br>46.1 | 4.6 | 27.4<br>28.7<br>28.2 | 1.62<br>1.62<br>1.62 | 4.6 |
| B | 1<br>2<br>3 | 45.2<br>46.1<br>45.2 | 1.98 | 23.1<br>27.0<br>27.2 | 1.95<br>1.71<br>1.66 | 15.9 |
| C | 1<br>2<br>3 | 45.9<br>44.3<br>46.6 | 5 | 27.7<br>27.6<br>28.2 | 1.65<br>1.60<br>1.65 | 2.1 |
| D | 1<br>2<br>3 | 46.93<br>47.20<br>47.08 | 0.57 | 27.63<br>27.78<br>27.88 | 1.70<br>1.70<br>1.69 | .9 | drive shaft which is controllable independently of the illustrated shaft 39. This independent control assists in the attaining of a completely uniform slurry discharge onto the underlying table 1, since differences in auger pitch in the two casing halves, for example, may cause slight differences in discharge from the two slot half portions. The augers have a helical shape, revolve about the stationary support tubes 34, and effect a close fit with the tubes so that a scraping action keeps the inner tube clean. A similar scraping action exerted by the augers against the inside of the casing 15 likewise cleans that member, as is evident from FIG. 3A.

The shaft seals 42 and 43, see FIG. 3, prevent ingress of the slurry into each support tube, but if this protection for the bearings 40 should prove inadequate, a slight positive air pressure may be maintained within each support tube 34. The end of the slurry passageway is sealed by the collar 36 and there is, therefore, no possibility of any contamination of the outer bearing 41 or of an accumulation of fibrous reinforcing materials which are often present in the slurry to bind the auger 45.

If desired, a portion of the slurry may be withdrawn from the mixer and passed through a supplemental mixer to increase the hardness of the edges as taught in Summerfield Patent No. 2,985,219 dated May 23, 1961. When operated in this fashion the supplemental stream is deposited on the paper, generally beyond the outer edges of the slurry issuing down the apron 47.

The increased uniformity of the slurry delivered to the work table 1, utilizing the process and apparatus of this invention, is evidenced by the data below which compare the performance of the above-described apparatus with that of a pin mixer using the conventional three-gate discharge system of the prior art. In gathering the data, three samples were taken simultaneously, one from each stream of a conventional prior art machine, and cast into two-inch cubes. Shortly after the cubes were set, they were weighed to determine their wet density, then dried in an oven at 110° F. and weighed again to determine their dry density. The difference between the two weights is reported as evaporation, all figures being reported on the basis of pounds per cubic foot. When analyzing the single stream deposited by the apparatus of this invention, three samples were taken simultaneously Sample set A of Table I shows a mixing condition in which the density-evaporated water ratio was constant but in which there was an excessive quantity of foam in the slurry issuing from the gate at sample station 1, causing its density to be low. This type of variation results in the board having low strength on the side formed by slurry discharging from station 1, and, as a result of the lower quantity of water being evaporated, that side tended to "burn" in the kiln during the subsequent drying step.

Sample set B illustrates a condition in which the stucco-foam ratio was nearly constant as indicated by the small variation in the dry density but in which the water was poorly distributed. An evaporation variation of this magnitude always produced substandard board but, fortunately, was not encountered frequently.

Sample set C illustrates a condition in which the foam and water were rather uniformly distributed but a considerable variation in the concentration of stucco was apparent. This condition required an excessive quantity of stucco to be employed at the edges of the board, thus imposing an economic penalty upon its production if the center area was to be maintained at a prescribed minimum density. In the foregoing illustrations, the variations in density range from just under 2 percent to about 5 percent; as a rule, if the variation did not exceed 3 percent, performance was considered "good."

The uniformity of production of apparatus of the present invention is illustrated by sample set D of Table I. It should be noted that the "dry density" variation is only slightly more than one-half of one percent and the "evaporation" variation is less than one percent. This uniformity has yielded extremely high quality gypsum products and also has resulted in a more desirable, lower-weight product since excess material need no longer be added to insure that the weakest spot will pass the standard relating to minimum strength.

To further illustrate the improved operation obtainable with the apparatus of this invention, a series of samples was taken of the slurry discharged according to conventional three-gate operation, and a second series was taken after the installation of the mixer-distributor described above. The results from twenty sets of such samples are presented in Table II and shown in graphical form in FIGS. 7A and 7B of the drawings. The differences between the highest and lowest value from each set are identified as the "spread."

TABLE II.—COMPARATIVE MIXER PERFORMANCE IN POUNDS PER CUBIC FOOT

| | Three gate mixer | | | | | | | |
|---|---|---|---|---|---|---|---|---|
| | Wet density sample station | | | | Dry density sample station | | | |
| Sample set | 1 | 2 | 3 | Spread | 1 | 2 | 3 | Spread |
| A | 76.3 | 74.8 | 73.4 | 2.9 | 48.3 | 47.1 | 46.4 | 1.9 |
| B | 73.4 | 71.9 | 71.9 | 1.5 | 45.7 | 44.7 | 44.7 | 1.0 |
| C | 72.4 | 71.4 | 71.2 | 1.2 | 45.4 | 44.7 | 44.7 | .7 |
| D | 74.6 | 72.6 | 72.1 | 2.5 | 45.1 | 45.3 | 44.7 | .6 |
| E | 76.7 | 72.6 | 71.9 | 4.8 | 46.1 | 44.3 | 44.3 | 1.8 |
| F | 74.8 | 74.1 | 74.1 | .7 | 47.8 | 45.2 | 44.7 | 3.1 |
| G | 76.1 | 75.0 | 73.4 | 2.7 | 45.7 | 45.0 | 45.0 | .7 |
| H | 77.8 | 77.5 | 76.5 | 1.3 | 46.6 | 46.1 | 45.4 | 1.2 |
| I | 75.5 | 74.6 | 77.8 | 3.2 | 48.3 | 48.1 | 47.8 | .5 |
| J | 73.1 | 72.8 | 71.9 | 1.2 | 46.6 | 45.7 | 47.8 | 2.1 |
| K | 74.8 | 71.9 | 73.6 | 2.9 | 45.4 | 45.4 | 45.0 | .4 |
| L | 76.3 | 74.6 | 72.8 | 3.5 | 46.6 | 44.3 | 45.9 | 2.3 |
| M | 79.1 | 78.2 | 77.2 | 1.9 | 46.8 | 45.4 | 44.3 | 2.5 |
| N | 77.8 | 78.6 | 78.6 | .8 | 47.1 | 47.6 | 47.3 | .5 |
| O | 72.6 | 72.1 | 70.4 | 2.2 | 45.2 | 45.0 | 43.8 | 1.4 |
| P | 79.6 | 78.6 | 77.2 | 2.4 | 50.9 | 49.3 | 48.8 | 2.1 |
| Q | 76.9 | 75.3 | 74.6 | 2.3 | 46.8 | 46.1 | 46.1 | .7 |
| R | 72.1 | 73.6 | 73.8 | 1.7 | 44.0 | 45.4 | 45.2 | 1.4 |
| S | 73.8 | 73.4 | 72.8 | 1.0 | 46.4 | 45.7 | 45.7 | .7 |
| T | 75.6 | 73.8 | 73.6 | 2.0 | 47.1 | 46.4 | 46.4 | .7 |
| Average | 74.6 | | | 2.1 | 46.0 | | | 1.3 |

| | Mixer-distributor | | | | | | | |
|---|---|---|---|---|---|---|---|---|
| | Wet density sample station | | | | Dry density sample station | | | |
| Sample set | 1 | 2 | 3 | Spread | 1 | 2 | 3 | Spread |
| AA | 77.2 | 77.2 | 76.5 | .7 | 48.8 | 48.8 | 48.6 | .2 |
| BB | 76.9 | 76.3 | 76.1 | .8 | 48.8 | 48.3 | 48.3 | .5 |
| CC | 78.0 | 76.7 | 76.9 | 1.3 | 49.5 | 48.6 | 48.8 | .9 |
| DD | 77.5 | 76.9 | 76.1 | 1.4 | 49.0 | 48.8 | 48.3 | .7 |
| EE | 78.0 | 78.8 | 77.8 | 1.0 | 49.5 | 50.7 | 49.5 | 1.2 |
| FF | 78.6 | 78.6 | 77.8 | .8 | 50.3 | 50.3 | 49.5 | .8 |
| GG | 78.6 | 78.6 | 78.0 | .6 | 50.3 | 50.3 | 49.7 | .6 |
| HH | 78.6 | 78.4 | 77.5 | 1.1 | 50.3 | 50.0 | 49.0 | 1.3 |
| II | 76.5 | 76.7 | 76.3 | .4 | 48.6 | 49.0 | 48.6 | .4 |
| JJ | 76.3 | 76.3 | 76.1 | .2 | 47.6 | 47.6 | 48.6 | 1.0 |
| KK | 77.5 | 77.5 | 76.5 | 1.0 | 49.5 | 49.7 | 49.0 | .7 |
| LL | 77.5 | 77.5 | 76.7 | .8 | 49.5 | 50.0 | 49.3 | .7 |
| MM | 76.5 | 76.3 | 76.1 | .4 | 47.8 | 48.1 | 47.8 | .3 |
| NN | 75.0 | 75.3 | 75.0 | .3 | 45.7 | 45.9 | 46.1 | .4 |
| OO | 74.8 | 76.1 | 74.6 | 1.5 | 46.6 | 48.1 | 46.8 | 1.5 |
| PP | 75.3 | 75.0 | 74.8 | .5 | 47.3 | 46.8 | 47.1 | .5 |
| QQ | 76.5 | 76.1 | 75.5 | 1.0 | 48.3 | 48.1 | 47.6 | .7 |
| RR | 75.8 | 75.5 | 75.5 | .3 | 47.8 | 47.8 | 47.8 | 0.0 |
| SS | 76.5 | 76.3 | 76.3 | .2 | 48.3 | 48.1 | 48.1 | .2 |
| TT | 76.5 | 76.5 | 76.5 | 0.0 | 48.6 | 48.8 | 48.8 | .2 |
| Average | 76.69 | | | 0.71 | 48.55 | | | 0.64 |

Referring to the data for the three-gate mixer, the average spread for the wet density was 2.1 pounds per cubic foot or 2.8 percent and the average spread for the dry density was 1.3 pounds per cubic foot or 2.8 percent. Ordinarily, these samples are considered very acceptable. It will be noted that when using the mixer-distributor of this invention, the average wet spread was only 0.71 pound per cubic foot or 0.9 percent and the average dry density spread was 0.64 pound per cubic foot or 1.3 percent, approximately half as great as in conventional operation. It is seen, therefore, that the overall results were much more uniform. The great deviations from the average encountered with a prior art machine, as shown in FIG. 7A, were minimized with the above-described apparatus, as shown in FIG. 7B.

The apparatus of this invention has a further advantage in that it overcomes a condition known as stream-juncture fracture which sometimes occurs in broad reinforced with long mineral fibers, such as glass fibers one-half inch or more in length. When the slurry containing the reinforcing fibers is deposited through three gates, the fibers tend to line up parallel to the edge of the board where the streams meet and so do not properly intermix to reinforce those areas. With the present invention, they are continuously and uniformly dispersed across the board width so that this difficulty is avoided. Moreover, the long fibers, surprisingly, do not plug the apparatus but are handled continuously and smoothly for long periods of time.

It is apparent that modifications may be made in the above-described apparatus which do not withdraw the resulting apparatus from the invention as defined by the appended claims. Thus, for producing boards of narrower width, portions of the slot 46 can be blocked off so that two or three narrow streams may be deposited upon the work table on separate sheets of paper while maintaining the advantages of a uniform core composition demonstrated above.

It is understood, therefore, that this invention is not to be limited to the particular embodiment shown and described above, since many modifications may be made, and it is contemplated by the appended claims to cover such modifications as fall within the true spirit and scope of this invention.

We claim:

1. In a gypsum board machine, the combination comprising a mixer for slurry preparation, an underlying board-forming table, positive displacement means in the mixer, conduit means communicating with said displacement means, a slurry distributor positioned above the board-forming table and substantially parallel to its upper surface, said distributor comprising an outer casing having an inlet near its center connected to said conduit means and a continuous discharge slot formed in the casing bottom; axial transfer means within said casing and extending from said inlet along the length of said slot, stationary support means associated with said transfer means and secured to said casing, and drive means disposed within said support means for actuating said transfer means; said transfer means effecting a scraping action on said support means and said casing whereby slurry entering said casing is forced through said slot in a uniform stream.

2. In a gypsum board machine having a mixer for slurry preparation and an underlying table for forming the board, the combination comprising a displacement rotor ring within the mixer, a conduit communicating with slurry contacted by the rotor ring, a slurry distributor positioned above the board-forming table and parallel to its upper surface, said distributor comprising an outer casing having an inlet near its center connected to said conduit and a continuous discharge slot formed in the casing bottom; screw augers snugly received within said casing and extending in opposite directions from said inlet for driving slurry in a uniform continuous stream through said discharge slot, stationary support tube means supportably engaging each auger and secured to said casing at the tube means outer ends, and drive means disposed within each of said support tubes to rotate said augers.

3. In a gypsum board machine having a mixer for slurry preparation and a table for forming the board, the combination comprising a mixer housing, a displacement rotor ring rotatable adjacent the outer periphery of said housing and having a plurality of upstanding elements, the leading edges of said elements forming an acute angle with their radially innermost sides, an enclosed conduit located adjacent the outer edge of the rotor ring, a distributor positioned above the board-forming table and parallel to its upper surface, said distributor comprising an outer casing having an inlet near its center connected to said conduit, a support tube secured within the casing at opposed ends thereof, a drive shaft extending into said casing from either end and journaled within said support tube, a seal disposed between each shaft and each support tube adjacent their inner ends and adjacent said casing inlet, transfer means surrounding the inner portion of the support tube and adapted to be driven by said drive shaft, said casing having a discharge opening in the central casing portion disposed beneath said transfer means and over said table, said transfer means driving said slurry in a substantially uniform continuous stream through said discharge opening, and means for moving a paper sheet beneath said discharge opening whereby a substantially uniform layer of slurry may be deposited on said moving sheet, and means for applying an upper sheet of paper to said moving discharged slurry.

4. In a gypsum board machine having a mixer for slurry preparation and a table for forming the board, an apparatus in combination with said mixer for distributing said slurry across said table which comprises an outer tubular casing having an inlet near its longitudinal midpoint and a continuous discharge slot formed in the bottom thereof, support tubes extending into said casing from either end and secured within the casing at its ends, drive shafts journaled within each of said support tubes, a seal between each shaft and its support tube adjacent their inner ends, and augers surrounding the inner portions of said support tubes and adapted to be driven by the shafts for driving slurry in a uniform continuous stream through said slot; said augers effecting a scraping action on said casing and support members in the normal course of movement.

5. The apparatus of claim 2 including a conveyor within the conduit from the mixer to the casing.

6. The apparatus of claim 2 wherein the screw augers are adapted for rotation in the same direction and have a substantially equal pitch and opposite hand.

7. The machine of claim 4 in which variable speed means are associated with each of said shafts for regulating the speed of rotation thereof.

8. In a gypsum board machine an apparatus for slurry preparation and distribution comprising a table for forming the board, a mixer disposed above said table, distributor means comprising an outer tubular casing disposed above and substantially parallel to said table, said casing having an inlet near its longitudinal midpoint communicating with said mixer, support tubes extending into said casing from either end and secured within the casing at its ends, drive shafts journaled within each of said support tubes, a seal between each shaft and its support tube adjacent their inner ends, augers surrounding the inner portions of each support tube and adapted to be driven by the shafts, variable speed means associated with each shaft for regulating its speed of rotation, discharge means in the central portion of said casing and adjacent said table, and an apron extending from said discharge means and toward said table.

9. The apparatus of claim 8 wherein the support tubes are pressurized.

References Cited

UNITED STATES PATENTS

| | | | |
|---|---|---|---|
| 582,060 | 5/1897 | Hitchins | 156—346 |
| 2,088,813 | 8/1937 | Roos | 156—39 |
| 2,366,673 | 1/1945 | Paley | 156—346 |
| 2,660,416 | 11/1953 | Camp et al. | 259—178 |
| 2,985,219 | 5/1961 | Summerfield | 156—39 |

MORRIS SUSSMAN, Primary Examiner

U.S. Cl. X.R.

156—39; 259—8, 148, 178